United States Patent [19]

Diba

[11] Patent Number: 4,498,822
[45] Date of Patent: Feb. 12, 1985

[54] SOLAR PANEL HANDLING AND MOUNTING DEVICE

[75] Inventor: Keyvan T. Diba, Los Angeles, Calif.

[73] Assignee: Solir Corporation, Van Nuys, Calif.

[21] Appl. No.: 466,162

[22] Filed: Feb. 14, 1983

[51] Int. Cl.³ .................................................. F24J 3/02
[52] U.S. Cl. ........................................ 410/2; 248/127;
248/188.1; 126/450
[58] Field of Search ............................ 410/2, 31–33;
248/127, 188.1, 460; 224/151; 126/450;
294/141; 16/DIG. 12, DIG. 24; 414/11;
52/712

[56] References Cited

U.S. PATENT DOCUMENTS

| | | | |
|---|---|---|---|
| 3,281,031 | 10/1966 | Shapiro | 294/141 X |
| 3,612,301 | 10/1971 | Peacock | 410/32 X |
| 4,269,173 | 5/1981 | Krueger et al. | 126/450 |
| 4,361,134 | 11/1982 | Bowen | 126/450 X |
| 4,404,962 | 9/1983 | Zinn et al. | 126/450 |

Primary Examiner—Robert B. Reeves
Assistant Examiner—Russell D. Stormer
Attorney, Agent, or Firm—Allan M. Shapiro

[57] ABSTRACT

The device is formed with flanges at right angles to each other which can engage the edge and side of a solar panel and be secured thereto. The device has a handgrip thereon for manual handling of the solar panel during transportation and installation. The device has openings therein for securing the solar panel in place during transportation and at installation.

19 Claims, 8 Drawing Figures

U.S. Patent  Feb. 12, 1985  Sheet 1 of 2  4,498,822
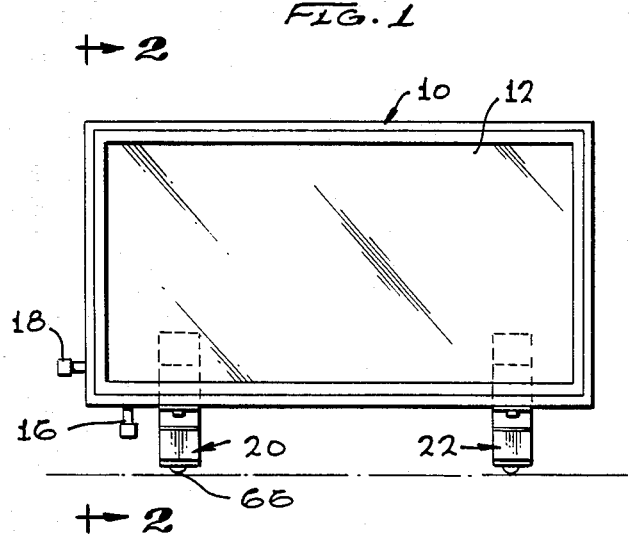
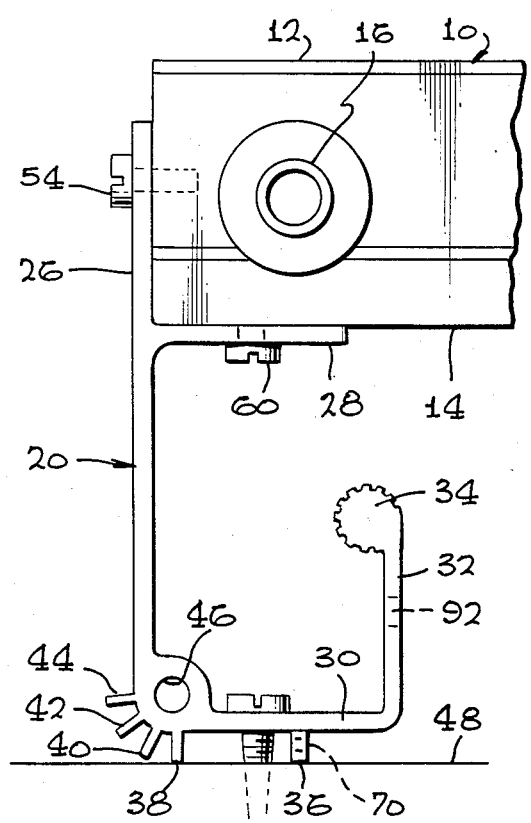
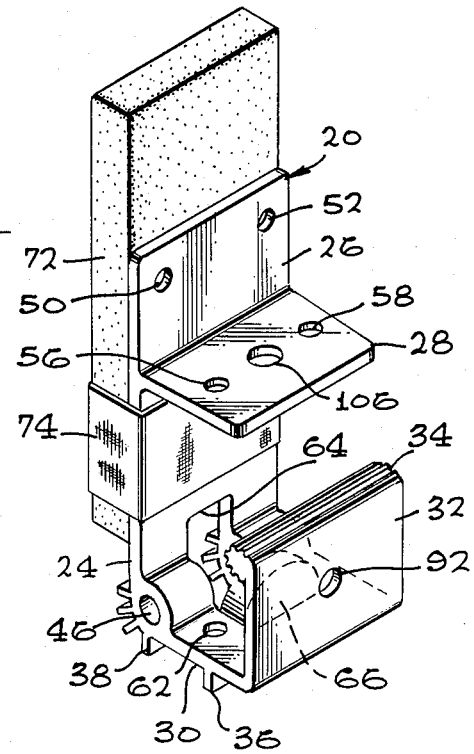
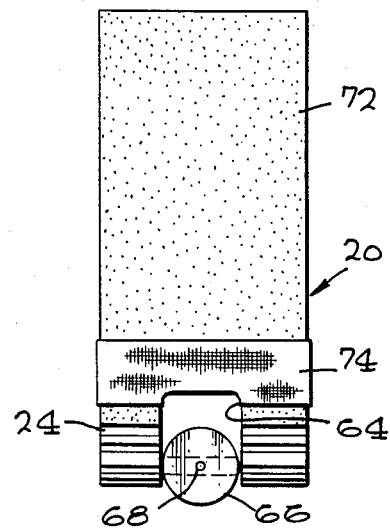

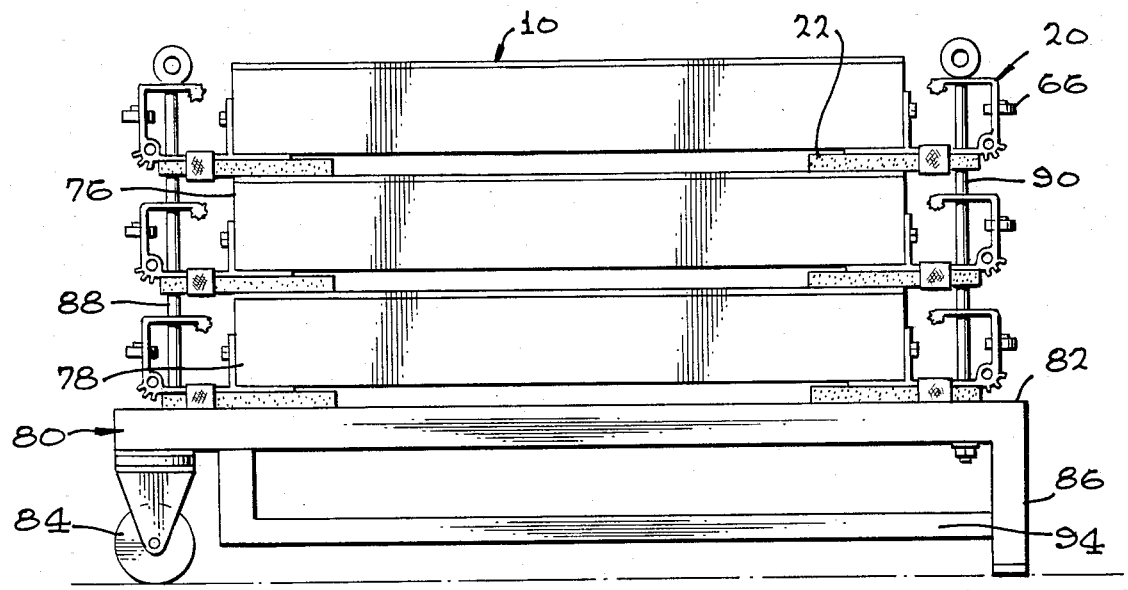
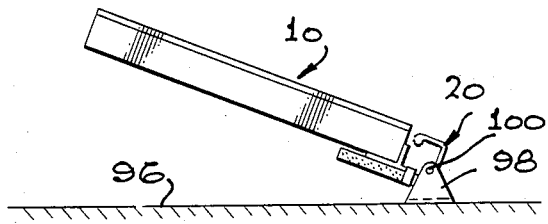
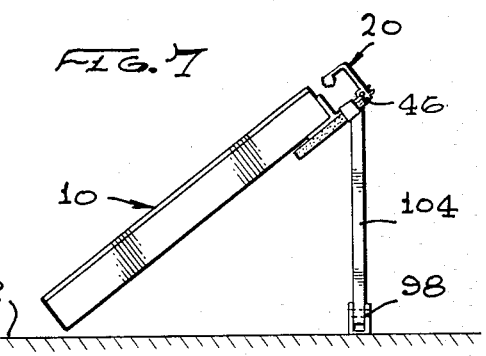
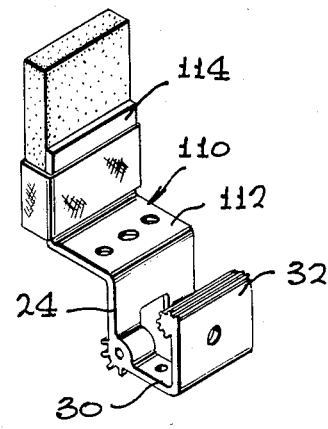

SOLAR PANEL HANDLING AND MOUNTING DEVICE

BACKGROUND OF THE INVENTION

This invention is directed to a device which is permanently installed on a solar panel to aid in both its transportation and installation securement.

In modern building construction, prefabricated panels of various types are widely used. These panels are produced for various purposes and are transported from the manufacturing site to the place of installation. Such panels must be transported in groups; they must be stored; and often, must be individually handled. In order to maximize protection of such panels, protective devices must be employed.

One type of panel that particularly needs such protection is the solar panel, because of its glass window, because of its frame, and because of its connection protrusions. There is need for a handgrip which can be detachably secured to a solar panel and the like to provide protection for the solar panel in stacking, standing, and protection for the connection tubes extending from the frame. In addition, such a handgrip should provide a comfortable and secure place for manual grasp of the solar panel to ease the physical placement of the solar panel.

In addition to the need for a handgrip on these bulky panels, there is need for a permanently installed device which permits the panels to be stacked, transported and installed. Therefore, a device which is permanently attached to the solar panel through its storage, transportation and installation aids in the handling of the solar panel through all the stages of its handling to and including final installation so as to minimize the chances of damage to the solar panel.

SUMMARY OF THE INVENTION

In order to aid in the understanding of this invention, it can be stated in essentially summary form that it is directed to a device for the handling and subsequent mounting of a solar panel. The device includes flanges which engage on and are secured to surfaces of a solar panel. A manually engageable handle is secured to the flanges and appropriate openings are provided for securing the device in place.

It is, thus, an object of this invention to provide a solar panel handling and mounting device so that a solar panel to which it is attached can be manually engaged for the convenient handling of the solar panel.

It is a further object to provide such a device which is permanently mountable to a solar panel and has appropriate openings therein so that the device and the solar panel secured thereto can be mounted in a position for utilization.

It is another object of this invention to provide a solar panel handling and mounting device wherein the device has at least temporarily secured thereto pads which permit stacking of a plurality of solar panels which carry such devices and, in addition, the devices are provided with a corner having studs thereon which permit the device and the solar panel secured thereto to be leaned against a wall with a stud preventing slipping out to enhance the security of the solar panel.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a front elevational view of a solar panel, carrying two of the solar panel handling and mounting devices of this invention.

FIG. 2 is an enlarged end view, with parts broken away, showing the mounting of one of the handling and mounting devices of this invention with respect to a solar panel, and showing the attachment thereof to a supporting base.

FIG. 3 is an isometric view of the first preferred embodiment of the solar panel handling and mounting device of this invention.

FIG. 4 is a rear elevational view thereof.

FIG. 5 is an end view of a plurality of stacked solar panels, each equipped with the device of FIG. 3, shown secured to a dolly.

FIG. 6 shows a first manner in which the device of FIG. 3 is used for the mounting of a solar panel in the location in which it will be utilized.

FIG. 7 shows a second manner in which the device of FIG. 3 is used in mounting a solar panel.

FIG. 8 is an isometric view of a second preferred embodiment of the solar panel handling and mounting device of this invention.

DESCRIPTION OF THE PREFERRED EMBODIMENTS

Solar panel 10 is shown in FIGS. 1, 2, 5, 6 and 7. Modern solar panels, such as solar panel 10, are formed of edge extrusions which serve to outline the rectangular configuration of the structure. The extrusions are mitered and joined in a rectangular configuration. The extrusions contain grooves for the front 12 and back 14. The back is a structural part and has insulation interiorly thereof. Front 12 is made of a material which has a high transmissivity of solar radiation and a low transmissivity of infrared radiation, such as glass. Behind the glass and in front of the insulation is a device to receive the solar radiation and convert it into heat. Usually, that device is cooled by circulating fluid. Header 16, see FIG. 2, extends from one of the edges of solar panel 10 and a similar header 18, see FIG. 1, extends from one of the other edges of the solar panel 12. The headers are connected to permit the circulation of the cooling fluid. Solar panel 10 is positioned to receive solar radiation and to be connected for cooling fluid flow. When positioned in that manner, the solar panel must be secured in place.

The solar panel handling and mounting devices 20 and 22 are illustrated in FIG. 1 in connection with solar panel 10. The devices 20 and 22 are identical, and device 20 is shown in more detail in FIGS. 2, 3 and 4. The solar panel handling and mounting devices are of uniform cross-section except for later drilling and machining so that the original forming may be accomplished by extrusion. As is seen in FIGS. 2 and 3 and to a lesser extent in FIG. 4, device 20 has a main web 24 which serves as the upstanding back of device 20. At the top of web 24 are attachment flanges 26 and 28 which are oriented at right angles with respect to each other. Flange 26 is in line with web 24 to form the back of the device 20. At the bottom of the web 24, bottom flange 30 extends forward from web 24 and handgrip flange 32 extends up away from bottom flange 30. Rounded edge 34 is formed on the upper edge of handgrip flange 32. The size and spacing of bottom flange 30, handgrip flange 32 and rounded edge 34 are such that a man's fingers may be hooked around inside of flange 32 with his palm against the outside of flange 32 for secure manual grip on the device 20. Rounded edge 34 aids in preventing the fingers from slipping off.

Also formed as part of the device 20 during its extrusion is support web 36. In addition, corner webs 38, 40, 42 and 44 are divergently oriented and extend generally radially outward from the center of pivot hole 46 which is formed adjacent the juncture of web 24 and bottom flange 30. The corner webs are configured so that corner web 38 extends as far down from bottom flange 30 as does support web 36, and the other corner webs are substantially the same radial length. The webs 36 and 38 serve to support device 20 on the surface 48, with the web 24 in the upright direction. In addition, the corner webs 38, 40, 42 and 44 reduce the chance of slipping when the solar panel is leaned against a wall for temporary support. The corner webs engage on the surface and help prevent the bottom from slipping out.

Fastening holes and other holes are provided through the various webs and flanges so that the device 20 may be attached to a solar panel in various different ways. Fastening holes 50 and 52 are formed in flange 26, see FIG. 3. As seen in FIG. 2, screw 54 and a companion screw are engaged through the holes 50 and 52 and into the panel 10. Similarly, fastening holes 56 and 58 are located in flange 28 so that screw 60 and a companion screw can be engaged through flange 28 into the solar panel 12. In addition, a pair of fastening holes, one of which is seen at 62 in FIG. 3, is located in bottom flange 30. The two fastening holes through bottom flange 30 are spaced apart similarly to the fastening holes 56 and 58.

Clearance slot 64 is formed in the lower portion of web 24 and the adjacent portion of bottom flange 30 over to support web 36. Clearance slot 64 is sufficiently large as to receive wheel 66 which is carried on its cantilevered axle 68. Support web 36 has an axle hole 70 therein so that wheel 66 may be slipped into place with axle 68 in hole 70. With the handling devices 20 and 22 secured to solar panel 10, as shown in FIG. 1, with the flange 26 against the back of the solar panel, then the wheels on the devices can be used to aid in rolling the solar panel to the desired location.

The handling and mounting devices 20 and 22 are attached to the edge of the panel in the orientation illustrated in FIG. 1 for the purpose of transporting and storing the solar panels. FIGS. 3 and 4 illustrate resilient spacer block 72 temporarily secured to the outside of web 24 and flange 26 by means of pressure sensitive coated tape 74. The resilient spacer block 72 is conveniently a piece of foam synthetic polymer composition material. When a suitable number of handling and mounting devices is properly spaced around the edges of the solar panel 10, then a plurality of such panels may be stacked. As is seen in FIG. 5, several solar panels each have four handling and mounting devices secured thereto, two spaced along each of the longer edges of the solar panel, with two shown in such position in FIG. 1. With the resilient spacer block in place, the plurality of solar panels can be stacked as shown.

Solar panels 10, 76 and 78 are each equipped with the solar panel handling and mounting devices of this invention and are stacked on a dolly 80. Dolly 80 has a top supporting surface 82 which is at least of sufficient area to support the resilient spacer blocks underneath the solar panels. Dolly 80 is equipped with wheels 84 so that it may be moved with a plurality of solar panels thereon and legs 86 which permit the dolly to lie horizontal when not in use. Tiedown bolts 88 and 90 engage through fastening holes 92, see FIGS. 2 and 3, and through clearance slot 64 so that the stacked solar panels are held in the stacked position. Tiedown bolts 88 and 90 engage in suitable openings in the dolly and are retained in place by threaded connection. In addition, dolly 80 has support brackets 94 thereon which are of suitable size and shape to engage on the top of solar panels mounted on another, similar dolly. With resilient spacers placed therebetween, one dolly with its load may thus be placed on top of another loaded dolly. In such a case, the tiedown bolts extend down through the entire structure to maintain it rigid and strong. In this configuration, a stack may be carried on a truck to the job site where individual dollies with their loads are removed by crane and, thereupon, are manually dollied close to the site where they will be installed. By the use of the dolly 80 and similar dollies, a plurality of solar panels may be safely handled and brought close to the place where they are to be installed. The tiedown bolts are removed and the panels are then individually manually handled and carried to the position of actual installation. Such manual handling is accomplished by the manual engagement of the handgrip flange 32 so that the solar panel is moved into position.

FIG. 6 shows the solar panel 10 being mounted on supporting surface 96 employing the device 20 and preferably a similar device 22 beyond device 20 in that view. Pivot bracket 98 is mounted on surface 96 and pivot pin 100 extends through the pivot bracket and through pivot hole 96 in device 20. Solar panel 10 may be pivoted on pivot pin 100 to the required angle to the horizontal to maximize solar input. Other structures may be employed to retain the solar panel 10 at the desired angle.

In FIG. 7, pivot bracket 98 is mounted on support surface 102 and a connecting rod 104 engages in pivot hole 46 on device 20. By appropriately choosing the length of connecting rod 104, solar panel 10 may be supported at the required angle. Other structure supports the lower corner of solar panel 10. This other structure may be the same structure as is shown in FIG. 6.

In FIGS. 1, 5, 6 and 7, the solar panel handling and mounting device is shown as having its flange 26 against the side of the solar panel 10 and its flange 28 at the edge of the solar panel so that the device extends away from the edge of the solar panel. This is the most convenient position for stacking, transporting and manual handling and also serves as a means for securement during installation, as is shown in FIGS. 6 and 7. However, the handling and mounting device 20 can be installed with its flange 26 against the edge of the panel and its flange 28 against the side of the panel, as shown in FIG. 2. In this mounting position, the handling and mounting device 20 also serves as a manual handgrip so that the solar panel may be moved into place. Fastening hole 50 is the same distance from the corner between flanges 26 and 28 as the distance to fastening hole 56 so that the device 20 can be reinstalled with the screws 54 and 60 entering into the same original holes in the side and edge of solar panel 10. The distance between flange 28 and the bottom of support web 36 and corner web 38 is sufficient to hold the back 14 of solar panel 10 a sufficient distance above the mounting surface 48. After there is no more need for stacking or leaning solar panels and after the solar panels are installed, the resilient spacer block 72 may be easily removed by removal of tape 74.

Some solar panels have mounting studs extending from the edge thereof. These mounting studs are formed to extend from the edges of the solar panel and, thus, are permanently affixed. These studs may be used in connection with the solar panel handling and mounting device 10. For this reason, stud opening 106 is provided in flange 28 between the fastening holes 56 and 58. Such studs are shown in FIGS. 1 and 5 and have nuts over the flange 28 in order to retain the handling and mounting device in place.

Solar panel handling and mounting device 110 illustrated in FIG. 8 is very similar to the device 20. It has the same web 24, bottom flange 30 and handgrip flange 32, together with their appurtenant shapes, pivot holes, webs and fastening holes as the corresponding parts shown in FIG. 2. However, in the device 110, flange 112 extends back from the top of web 24 and flange 114 extends up from the outer end of flange 112. Thus, as compared to the device 20 in FIG. 2, the flanges 112 and 114 are set back a distance equal to the width of flange 28. The same corner is formed between flanges 112 and 114, with this corner embracing a corner of the solar panel so that the device 110 is secured at the edge and side of the solar panel. The offset in FIG. 8, in some conditions, places the handle and mounting holes in a better position for grasp and mounting.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A handling and mounting device comprising:
   a web forming the body of said device;
   a bottom flange secured to said web at an angle with respect thereto;
   a handgrip flange secured to said bottom flange at an angle with respect thereto so that said handgrip flange can be manually grasped for manual handling thereof and handling of a panel secured to said device, attachment openings through at least one of said bottom flange and said handgrip flange so that said device can be secured to a base; and
   at least one attachment flange joined to said web so that said attachment flange can be secured to a panel.

2. The handling and mounting device of claim 1 wherein there are two attachment flanges adjacent each other and positioned substantially at right angles to each other for attachment to the edge and one side of a panel.

3. The handling and mounting device of claim 2 wherein there are openings through both of said attachment flanges so that fastening means may be inserted through said openings in said attachment flanges to secure a panel to said handling and mounting device.

4. The handling and mounting device of claim 3 wherein said openings through said attachment flanges for said fastening means are positioned the same distance from the juncture of said attachment flanges so that when either of said attachment flanges is on the edge of the panel, the other attachment flange is on the side of the panel with the same positioning of fastening means.

5. The handling and mounting device of claim 1 wherein one of said attachment flanges is in line with said web.

6. The handling and mounting device of claim 1 wherein a pivot pin hole is provided through said handling and mounting device in a direction parallel to both of said attachment flanges.

7. The handling and mounting device of claim 6 wherein one of said attachment flanges is in line with said web.

8. The handling and mounting device of claim 1 wherein there is wheel mounting means on said bottom flange and a wheel is pivotably mounted on said wheel mounting means, said wheel extending below said bottom flange so that said handling and mounting device can be moved on its wheel.

9. The handling and mounting device of claim 8 wherein one of said attachment flanges is in line with said web.

10. The handling and mounting device of claim 9 wherein a pivot pin hole is provided through said handling and mounting device in a direction parallel to both of said attachment flanges.

11. The handling and mounting device of claim 1 wherein a resilient spacer block is secured to one of said flanges so that a plurality of said handling and mounting devices can be secured to a panel and a plurality thereof may be stacked with said resilient spacer blocks therebetween for protection of the panels.

12. The handling and mounting device of claim 11 wherein there is a dolly having at least one wheel, said dolly being for stacking of a plurality of panels each carrying a plurality of handling and mounting devices, and each said handling and mounting device having a resilient spacer block thereon;
   tiedown means interengaging said dollies and the panels stacked thereon so that a plurality of the panels with said handling and mounting devices can be moved together.

13. The handling and mounting device of claim 12 wherein said fastening means comprises tiedown bolts engaging through said plurality of handling and mounting devices and engaging on said dolly.

14. A handling and mounting device comprising:
   a web;
   first and second attachment flanges positioned substantially at right angles to each other, one of said attachment flanges being in line with said web and both of said attachment flanges being secured to said web, said attachment flanges having openings therethrough so that fastening means may engage through said opening into a panel for securement of a panel with respect to said handling and mounting device with one of said attachment flanges against the edge of the panel and the other of said attachment flanges lying against the side of said panel;
   a handgrip attached to said web so that said handgrip can be manually engaged for positioning said handling and mounting device and the panel secured thereto.

15. The handling and mounting device of claim 14 wherein there said attachment openings in said attachment flanges are positioned the same distance from the juncture of said attachment flanges so that when either of said attachment flanges is positioned against the edge of the panel, the other of said attachment flanges lies against the side of said panel to employ the same fastening openings in the panel.

16. The handling and mounting device of claim 14 wherein said handgrip includes a bottom flange and a handgrip flange at an angle to each other, said bottom flange being secured to said web, a plurality of divergent corner webs secured to said bottom flange adjacent said web to inhibit slipping of said handling and mounting device and the panel mounted thereon.

17. The handling and mounting device of claim 14 wherein said handle comprises a bottom flange positioned substantially parallel to one of said attachment flanges and a handgrip flange secured to said bottom flange and directed towards said one attachment flange, said handgrip flange being sized for manual grasp, both said bottom flange and said handgrip flange having openings therethrough for attachment of said handling and mounting device to a support.

18. The handling and mounting device of claim 17 wherein said handgrip flange has a rounded edge thereon from comfortable manual grasp.

19. The handling and mounting device of claim 17 further including wheel mounting means on said bottom flange and a wheel rotatably and removably mounted on said wheel mounting means so that said handling and mounting device and the panel secured thereto may be moved on said wheel.

* * * * *